United States Patent
DeSouza Sana et al.

(10) Patent No.: US 9,838,347 B2
(45) Date of Patent: Dec. 5, 2017

(54) TAGS IN COMMUNICATION ENVIRONMENTS

(71) Applicant: Microsoft Technology Licensing, LLC, Redmond, WA (US)

(72) Inventors: Giselli Panontini DeSouza Sana, Redmond, WA (US); Amit Gupta, Redmond, WA (US); Sangya Singh, Redmond, WA (US); Naresh Sundaram, Redmond, WA (US); Tom Laird-McConnell, Redmond, WA (US); Johannes Gehrke, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 14/737,686

(22) Filed: Jun. 12, 2015

(65) Prior Publication Data
US 2016/0269334 A1 Sep. 15, 2016

Related U.S. Application Data

(60) Provisional application No. 62/131,816, filed on Mar. 11, 2015.

(51) Int. Cl.
*G06F 15/16* (2006.01)
*H04L 12/58* (2006.01)
*G06Q 10/10* (2012.01)

(52) U.S. Cl.
CPC ............ *H04L 51/18* (2013.01); *G06Q 10/107* (2013.01)

(58) Field of Classification Search
CPC .............................. G06Q 10/107; H04L 51/18
See application file for complete search history.

(56) References Cited

U.S. PATENT DOCUMENTS 6,275,811 B1 8/2001 Ginn
8,108,359 B1 * 1/2012 Cooley ............ G06F 17/30265
707/687

(Continued)

FOREIGN PATENT DOCUMENTS

EP 2475138 A1 7/2012
EP 2541856 A1 1/2013

(Continued)

OTHER PUBLICATIONS

"International Search Report and Written Opinion Issued in PCT Application No. PCT/US2016/021420", dated Apr. 28, 2016, 13 Pages.

(Continued)

*Primary Examiner* — Bryan Lee
(74) *Attorney, Agent, or Firm* — Turk IP Law, LLC

(57) ABSTRACT

Communication services enable users to communicate electronically using various modes of communication. Conversations between groups of users are common, where emails, other communications, and data are exchanged repeatedly over a period of time. Provision of tags in communication environments may enable the users to organize, search for, and share content of the conversations more efficiently, improving communication and collaboration among the users. For example, a tag module of a communication service may associate a communication with one or more tags such that the tags are persisted with the communication as the communication is exchanged, and transmit the communication to participants of the conversation. The tag module may also provide automatic classification, suggestion, and/or completion of the tags. The tags may be displayed in conjunction with the communication through communication user experiences associated with the partici- (Continued)

pants, where the participants may interact with the tags for search and organization purposes.

20 Claims, 10 Drawing Sheets

(56) References Cited

U.S. PATENT DOCUMENTS

| | | | |
|---|---|---|---|
| 8,321,361 | B1 | 11/2012 | Heath et al. |
| 8,504,626 | B2 | 8/2013 | Nairn et al. |
| 8,516,058 | B2 | 8/2013 | Stern et al. |
| 8,577,888 | B2 | 11/2013 | Portilla |
| 8,589,494 | B2 | 11/2013 | Garrett |
| 8,606,792 | B1 | 12/2013 | Jackson et al. |
| 8,799,379 | B1 | 8/2014 | Liden et al. |
| 8,825,658 | B1 | 9/2014 | Suvar |
| 8,843,568 | B2 | 9/2014 | Vitaldevara et al. |
| 8,918,468 | B1 | 12/2014 | Fisher et al. |
| 9,002,956 | B1 | 4/2015 | Karam |
| 9,324,028 | B1 | 4/2016 | Boshy et al. |
| 9,590,942 | B1 | 3/2017 | Yeskel et al. |
| 2005/0144246 | A1 | 6/2005 | Malik |
| 2006/0036696 | A1 | 2/2006 | Maresh |
| 2008/0040126 | A1* | 2/2008 | Estrada ............... G06Q 10/107 705/1.1 |
| 2008/0147818 | A1 | 6/2008 | Sabo |
| 2008/0215607 | A1 | 9/2008 | Kaushansky et al. |
| 2009/0199104 | A1 | 8/2009 | Pluschkell et al. |
| 2009/0235167 | A1 | 9/2009 | Boyer et al. |
| 2009/0240516 | A1 | 9/2009 | Palestrant |
| 2010/0017485 | A1 | 1/2010 | Gawor et al. |
| 2010/0211535 | A1 | 8/2010 | Rosenberger |
| 2011/0246910 | A1 | 10/2011 | Moxley et al. |
| 2012/0030232 | A1 | 2/2012 | John et al. |
| 2012/0041953 | A1 | 2/2012 | Dumais et al. |
| 2012/0060105 | A1 | 3/2012 | Brown et al. |
| 2012/0072260 | A1 | 3/2012 | Graham et al. |
| 2012/0209850 | A1 | 8/2012 | Kikin-Gil et al. |
| 2012/0265806 | A1 | 10/2012 | Blanchflower et al. |
| 2012/0303561 | A1* | 11/2012 | Sathish ............. G06F 17/30873 706/14 |
| 2013/0067333 | A1 | 3/2013 | Brenneman |
| 2013/0091229 | A1 | 4/2013 | Dunn et al. |
| 2013/0159333 | A1 | 6/2013 | Assam |
| 2013/0325878 | A1 | 12/2013 | Lichana |
| 2014/0122622 | A1 | 5/2014 | Castera et al. |
| 2014/0171129 | A1* | 6/2014 | Benzatti ............... H04W 4/025 455/457 |
| 2014/0188627 | A1 | 7/2014 | Elvekrog et al. |
| 2014/0282109 | A1 | 9/2014 | Wenger et al. |
| 2014/0289258 | A1* | 9/2014 | Joshi ................. G06Q 10/107 707/741 |
| 2014/0325391 | A1 | 10/2014 | Zhang |
| 2014/0330913 | A1 | 11/2014 | Pascal |
| 2014/0337436 | A1 | 11/2014 | Hoagland et al. |
| 2014/0351719 | A1 | 11/2014 | Cattermole et al. |
| 2014/0372446 | A1 | 12/2014 | Bell et al. |
| 2015/0032824 | A1 | 1/2015 | Kumar et al. |
| 2015/0081790 | A1 | 3/2015 | Ogawa |
| 2015/0095432 | A1 | 4/2015 | Soundararajan |
| 2015/0256499 | A1 | 9/2015 | Kumar et al. |
| 2016/0203523 | A1 | 7/2016 | Spasojevic et al. |
| 2016/0253715 | A1* | 9/2016 | Xie .................... G06Q 30/0251 705/14.72 |

FOREIGN PATENT DOCUMENTS

| | | |
|---|---|---|
| GB | 2482415 A | 2/2012 |
| WO | 2013066302 A1 | 5/2013 |

OTHER PUBLICATIONS

"Tagging in Pocket on your Computer", Published on: Dec. 19, 2014, Available at: http://help.getpocket.com/customer/portal/articles/332535-tagging-in-pocket-on-your-computer.

"Get Organized with Finder Tags", Retrieved on: Apr. 21, 2015, Available at: http://www.takecontrolbooks.com/resources/0169/site/chap06.html.

Madsen, Sonja, "SharePoint Hashtags, Metadata, Keywords, and Search", Published on: Jan. 27, 2014, Available at: http://sp2013.blogspot.in/2014/01/sharepoint-2013-hashtags.html.

"Add Tags to Your Outlook Email Messages, Just Like GMail Labels", Published on: Jul. 7, 2007, Available at: http://labnol.blogspot.in/2007/07/add-tags-to-your-outlook-email-messages.html.

"Office 365 (Outlook Web App)—Retention and archive policies in Outlook Web App", Retrieved on: Apr. 21, 2015, Available at: https://kb.wisc.edu/page.php?id=44774.

"Essential Add-Ins for Microsoft Outlook", Published on: Jun. 27, 2015, Available at: http://www.labnol.org/software/essential-microsoft-outlook-addins/10737/.

"How to make Email Tags work like Folders in Outlook", Published on: Nov. 23, 2012, Available at: http://www.standss.com/blog/index.php/how-to-make-email-tags-work-like-folders-in-outlook/.

"Tagging makes it easier to file the same email in two Outlook folders", Published on: Apr. 11, 2013, Available at: http://www.standss.com/blog/index.php/tagging-makes-it-easier-to-file-the-same-email-in-two-outlook-folders/.

Bohon, Cory, "Mavericks How-To: Organizing Files and Folders with Tags", Published on Oct. 25, 2013 Available at: http://www.maclife.com/article/howtos/mavericks_howto_organizing_files_and_folders_tags.

Shultz, Greg, "Tag your files for easier searches in Windows 7", Published on: Mar. 23, 2011 Available at: http://www.techrepublic.com/blog/windows-and-office/tag-your-files-for-easier-searches-in-windows-7/.

Halder, Soumen, "How to Add Tags in Windows Files for Quick and Easy Searching", Published on: May 17, 2010 Available at: http://www.maketecheasier.com/add-tags-in-windows-files-for-quick-and-easy-searching/.

Chaney, Paul, "8 Twitter Hashtag Tracking Tools", Published on: Jun. 27, 2013 Available at: http://www.practicalecommerce.com/articles/4078-8-Twitter-Hashtag-Tracking-Tools.

Oosterveld, Jasper, "SharePoint 2013—Keywords, tags and #hashtags", Published on: Mar. 24, 2013 Available at: http://sharepoint-community.net/profiles/blogs/sharepoint-2013-keywords-tags-and-hash-tags.

Horton, Steve, "Using Hashtags to Organize Files on the Cloud", Published Date: Apr. 3, 2013 Available at: http://www.reviversoft.com/blog/2013/04/using-hashtags/.

Farage, Adam, "Exchange 2010: Retention Tags and Policies 101", Published on: Jun. 4, 2012 Available at; http://blogs.technet.com/b/theexchangeguy/archive/2012/06/04/retention-polices-and-tags-101.aspx.

"MetaX for Windows", Published on: Oct. 18, 2012 Available at: http://www.danhinsley.com/MetaX%20Help%20PDF.pdf.

Bincer, Ronnie, "Share the Right Things with Just the Right People", Published on: Apr. 16, 2012 Available at: https://plus.google.com/+RonnieBincer/posts/focQkGJGgg9.

"Hashtags", Published on: Nov. 6, 2010 Available at: http://twitter.pbworks.com/w/page/1779812/Hashtags.

"SecondWritten Opinion Issued in PCT Application No. PCT/US2016/021420", dated Feb. 20, 2017, 9 Pages.

"International Preliminary Report on Patentability Issued in PCT Application No. PCT/US2016/021420", dated May 31, 2017, 10 Pages.

* cited by examiner

TAGS IN COMMUNICATION ENVIRONMENTS

CROSS-REFERENCE TO RELATED APPLICATION

This Application claims benefit under 35 U.S.C §119 (e) of U.S. Provisional Application Ser. No. 62/131,816 filed on Mar. 11, 2015. The Provisional Application is herein incorporated by reference in its entirety.

BACKGROUND

Communication service and/or applications enable two or more users to communicate electronically using multiple modes of communication such as email, text messaging, media exchange, audio communication, video communication, desktop sharing, data sharing, application sharing, and similar modes. Some communication services and/or applications include additional functionality such as scheduling, contact list management, task management and comparable ones. Conversations between groups of users are common, where emails, other communications, and data are exchanged repeatedly over a period of time. The users may spend large amounts of time managing such conversations, and searching for information and/or content associated with the conversations, decreasing overall productivity and causing potential disconnect in communication and collaboration among the groups of users.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to provision of tags in communication environments. A communication may be associated with one or more tags such that the tags are persisted with the communication as the communication is exchanged within a conversation. The communication may be transmitted to one or more participants of the conversation over one or more communication exchange channels, where the tags may be displayed in conjunction with the communication through communication user experiences associated with the participants.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
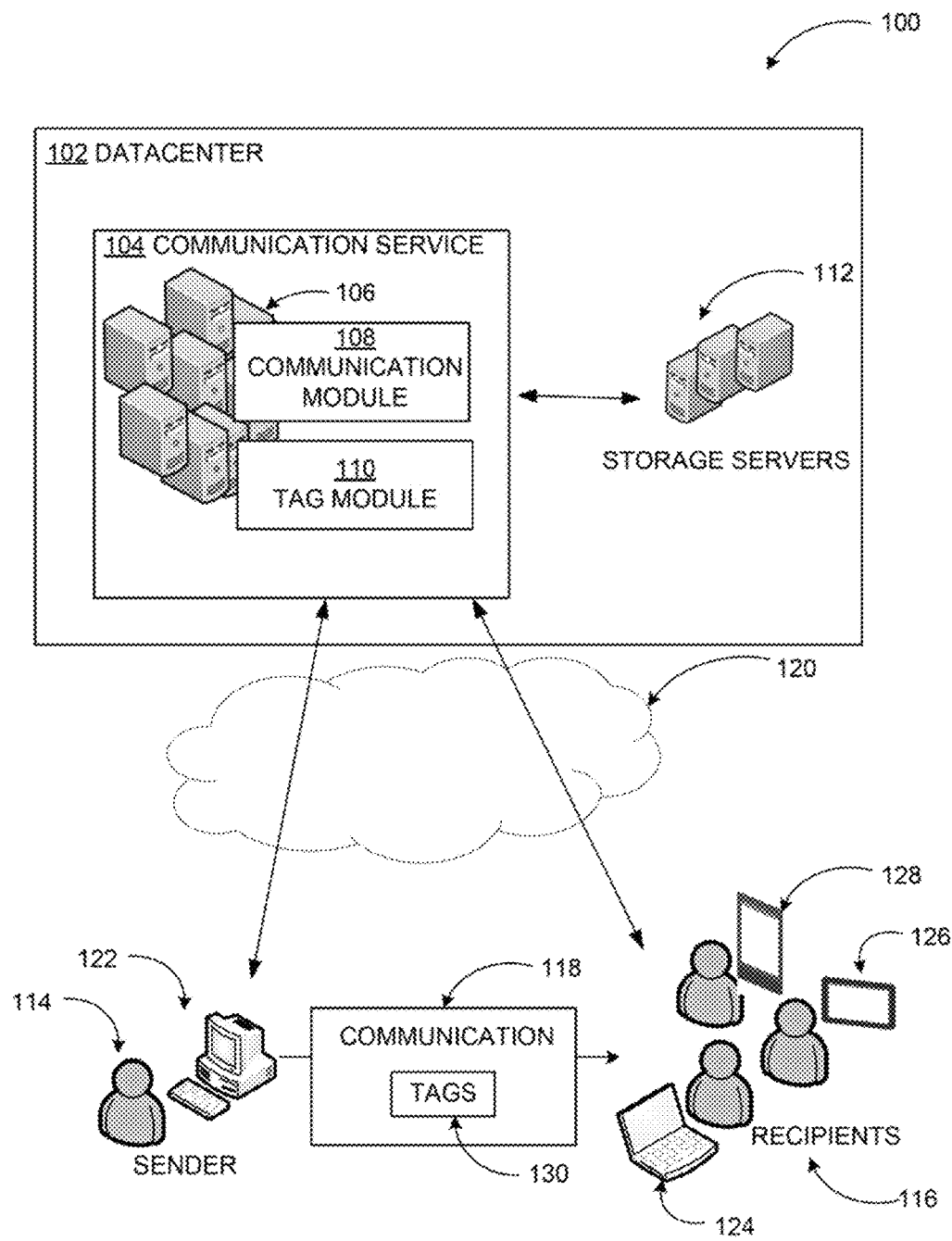
FIG. 1 includes a conceptual diagram illustrating an example communication environment where tags may be provided.

As briefly described above, conversations between groups of users are common, where emails, other communications, and data are exchanged repeatedly over a period of time. Provision of tags in communication environments may enable the users to organize, search for, and share content associated with the conversations more efficiently, which may improve communication and collaboration among groups of users. In an example scenario, a tag module of a communication service may associate a communication with one or more tags such that the tags are persisted with the communication as the communication is exchanged. The tags may include hashtags and/or labels, and may be stored as a property of the communication, for example, to enable persistence. In some embodiments, the tag module may also provide automatic classification, suggestion, and/or completion of the tags to improve user efficiency. The communication may be transmitted to participants of the conversation, where the tags may be displayed in conjunction with the communication through communication user experiences associated with the participants. The participants may be enabled to interact with the tags for search and organization purposes through the communication user experiences.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide a communication application or service with tagging functionality. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. An operating system may be a system configured to manage hardware and software components of a computing device that provides common services and applications. An integrated module is a component of an application or service that is integrated within the application or service such that the application or service is configured to execute the component. A computer-readable memory device may be a physical computer-readable storage medium implemented via one or more of a volatile computer memory, a non-volatile memory; a hard, drive, a flash drive, a floppy disk, or a compact disk, and comparable hardware media that includes instructions thereon to automatically save content to a location. A user experience may be a visual display associated with an application or service through which a user interacts with the application or service. A user action, such as a user selection, refers to an interaction between a user and a user experience of an application or a user experience provided by a service that includes one of touch input, gesture input, voice command, eye tracking, gyroscopic input, pen input, mouse input, and keyboards input.

An application programming interface (API) may be a set of routines, protocols, and tools for an application or service that enable the application or service to interact or communicate with one or more other applications and services managed by separate entities.

A tag, as used herein, refers to one of a hashtag and a label. The hashtag may be metadata in the format of a hash character, or number sign, followed immediately by a word or an unspaced phrase, and a label may be any type of categorization tool, for example. The tag may be private or public. A tag indication, as used herein, refers to a brief message or notification transmitted to one or more other participants of the communication, indicating the communication has been associated with a tag. The tags and tag indications are not limited to the examples provided herein. Similarly, communications in which tags may be used are not limited to emails or comparable text-based messaging. Other communications may include appointments/meetings, contacts, tasks, online conferences, audio/video communications, application sharing sessions, a desktop sharing sessions, and data sharing sessions, for example. Indeed, any form of electronic communication medium may be used to implement endorsement indications.

FIG. 1 includes a conceptual diagram illustrating an example communication environment, where tags may be provided. As illustrated in diagram 100, an example system may include a datacenter 102 hosting a communication service 104 configured to provide communication-based services to users in various modalities such as email, text messaging, audio/video conferencing, application sharing, desktop sharing, and the like. The datacenter 102 may include one or more processing servers 106, of which, at least one may be operable to execute a communication module 108 and a tag module 110, among other modules, such as a calendar module, a task module, and a contacts module of the communication service 104. The datacenter 102 may also include one or more storage servers 112 configured to manage one or more data stores comprising data associated with the communication module 108 and the tag module 110. As described herein, the modules of the communication service 104 may be implemented as software, hardware, or combinations thereof.

As illustrated in the diagram 100, the tag module 110 may be an integral part of the communication service 104. A client may be a thin client (e.g., a web browser) or a thick client (e.g., a locally installed client application), enabling a participant of a conversation, such as a sender 114 or one or more recipients 116 to access the communication service 104 over one or more networks such as network 120 via execution of the thin or thick client through an associated computing device. The associated computing device may include a desktop computer 122, a laptop computer 124, a tablet computer 126, a vehicle mount computer, a smart phone 128, or a wearable computing device, among other similar devices. If the client is a thin client, the tag module 110 of the communication service 104 may be configured to provide tagging capability. If the client is a thick client, the thick client may include a separate, corresponding tag module that works in conjunction with the tag module 110 of the communication service 104 to provide tagging functionality, for example. Alternatively, the tag module 110 may not be an integral part of the communication service 104. Instead, the thick client may have a separate tag module communicatively coupled to the tag modules of other thick clients to facilitate tagging functionality among participants of the conversation.

In an example embodiment, the communication module 108 of the communication service 104 may facilitate an exchange of one or more communications within a conversation between participants of the conversation. For example, the communication module 108 may facilitate exchange of a communication 118 between the sender 114 and the recipients 116. The communication 118 may be an email exchange, a meeting invite, a shared contact card, a shared task, a text message exchange, an online conference, an audio communication, a video communication, an application sharing session, a desktop sharing session, and/or a data sharing session, for example. A communication user experience associated with the communication service 104 may be configured to display the conversations and/or communications associated with an individual mailbox of a user, such as the sender 114 or the recipients 116, and/or a shared mailbox between multiple users. The mailbox may be a server, for example, configured to store exchanged communications, including both received and sent communications, as well as draft communications and deleted communications, among other communications.

The tag module 110 of the communication service 104 may enable the sender 114 of the communication 118 to associate one or more tags 130 with the communication 118. The tags 130 may include hash tags and/or labels associated with the communication 118, where the tags 130 may be public or private. The labels may include multiple categories for personal organization of the communication 118. For example, the labels may include to do, wait for, follow up, personal, and meeting, among other examples.

In some embodiments, the tag module 110 may employ machine learning techniques to one or more of automatically classify and/or suggest the tags 130 for association with the communication 118. First, the tag module 110 may be configured to automatically classify the communication 118 with one or more of the tags 130 based on a content of the communication 118. For example, if the content of the communication 118 includes a flight itinerary, the tag module 110 may automatically classify the communication with a flight hashtag. Second, the tag module may be configured to automatically suggest one or more of the tags 130 for association. For example, the tag module may determine one or more attributes of the communication 118, and automatically suggest the tags 130 based on a tag history of past communications that include similar attributes to the determined attributes of the communication 118. The attributes may include a sender, one or more recipients, key words in a subject, a size of the subject, key words in a body, a size of the body, and/or other tags associated with the communication, among other examples. In one example scenario, the sender 114 may have consistently associated past communications sent to a particular group of recipients (the recipients 116) with a hashtag, #DesignTeam. Accordingly, as the communication 118 is being sent to the particular group, the tag module 110 may suggest the hashtag, #DesignTeam. In conjunction with the suggestion, the tag module may provide the sender 114 an option to tag future communications that contain similar attributes with the same tags and/or enable the sender 114 to modify one or more rules associated with the suggestion. Additionally, the tag module 110 may be configured to automatically complete a tag with one or more existing tags when the sender 114 starts typing one or more of the tags 130 within the communication 118. For example, the sender 114 may begin typing #Des, and the tag module 110 may be configured to automatically insert and/or display a suggestion of an existing tag that matches #Des, such as #DesignTeam, for selection by the sender 114. If more than one existing tag matches, the suggestions may be displayed in a prioritized order based on the attributes of the communication 118. For example, if the existing tags #DesignTeam and #DeskIssues match, #DesignTeam may be displayed first.

The tag module 110 may store the tags 130 as a property of the communication 118 such that the tags may persist with the communication across mailboxes associated with the sender 114 and the recipients 116 as the communication 118 is exchanged. For example, a content of the communication 118 may be scanned for the tags 130, the tags 130 may be extracted, and metadata associated with, the tags 130 may be stored as a property of the communication 118. The property may be a conversation aggregated property such that the tags may be aggregated per-communication and per-conversation. The tag module 110 may then transmit the communication 118 with the associated tags 130 to the recipients 116 over the communication exchange channels, where the communication module 108 may facilitate the exchange. The tags 130 may be displayed in conjunction with the communication 118 through user experiences associated with the recipients 116. For example, the tags 130 may be displayed in a subject of the communication 118 and/or a body of the communication 118. In some examples, a coloring scheme, a highlighting scheme, and/or a shading scheme, among other schemes, may be employed for the displayed tags 130 to enhance visibility of the tags 130 among the other content of the communication 118. In some embodiments, the tags 130 may also be displayed in association with a conversation comprising the communication 118 through a conversation list pane in the communication user experiences associated with the recipients 116.

The recipients 116 may be enabled to interact with the tags 130 through the communication user experiences. The recipients 116 may search for conversations and/or communications employing the tags 130. For example, the recipients 116 may search for all received communications stored in their mailbox associated with the hashtag, #DesignTeam, through a navigation pane of the communication user experience. Additionally, the recipients 116 may be enabled to directly navigate to all conversations and/or communications, including the communication 118, associated with the tags 130 by selecting one or more of the displayed tags 130 through the communication user experiences. The recipients 116 may also be enabled to favorite these conversations and/or communications associated with the tags 130 in the navigation pane such that the recipients 116 may quickly reference them in the future. Additionally, the recipients 116 may be enabled to associate the communication 118 with additional tags upon receipt. For example, the recipients 116 may associate the communication 118 with a private label for the recipients' 116 own organizational purposes. Additionally or alternatively, the recipients 116 may associate the communication 118 with another public hashtag.

If one or more of the recipients 116 associate the communication 118 with additional public tags upon receipt, the tag module 110 may be configured to transmit a tag indication to the sender 114 and the other of the recipients 116 to provide notification of the additional tags. The tag module 110 may display the tag indication as a message or a notification that may include identifying information such as the recipient(s) that associated the additional tags, the tags 130, the communication 118, a group associated, with the communication 118, if applicable, and/or a time elapsed from the association of the additional tags, for example.

In some examples, the tag module 110 may transmit the tag indication over a designated communication channel distinct from the communication exchange channels. For example, the designated communication channel may be a control messaging channel in a transport layer of the communication service 104. Distribution of the tag indication using the designated communication channel may reduce traffic in the communication exchange channels, and thus prevent any potential decrease in service or performance due to a traffic overload. To achieve such a tag indication exchange, a lightweight and reliable mechanism for inter-mailbox communication may be employed. A transport stack that is used to deliver communications to mailboxes may be leveraged to use control messages as a reliable mechanism for inter-server communication. A standard format/schema for the control messages may be employed that distinguish the control messages from communications. For example, the control messages may include instructions for an action to be performed and metadata associated with the action, where the action may be generation of the tag indication and the metadata may include information associated with the tags 130. A sending component at a mailbox of the recipient that associated the additional tags may be configured to transmit a control message over the designated communication channel. A receiving component at a mailbox of the sender 114 and the other recipients 116, such as a transport delivery agent, may be configured to intercept the control message and process the metadata of the control message to generate the tag indication. The receiving component may store the tag indication in a database associated with the mailbox of the sender 114 and the other recipients 116 such that the tag indication may be persisted.

Tag functionality may be provided across conversation client endpoints. In some examples, the tag module 110 may be configured as an extension to an API of the communication service 104 so any third party application may use the framework to build tag functionality by connecting to the communication distribution mechanism. As such, communication clients, via execution of the tag module 110, may enable association of any communication/conversation in a user mailbox with multiple tags, persistence of tags across mailboxes of multiple users and/or groups, interactivity with tags for organizational and search purposes, and transmission/receipt of tag indications for display.

In other embodiments, the communication service 104 may be associated with a productivity suite. The productivity suite may provide communication, word processing, spreadsheet, presentation, note taking, and other comparable functionalities through the communication service and one or more other services/applications, for example. The tags 130 may be enabled to roam across the productivity suite such that the tags may be consistent among the services/applications of the productivity suite, enabling users to easily find content across the services/applications for a given tag. In some scenarios, a use of the one or more tags may be analyzed to determine trends associated with the user, a group of users, and/or an organization. For example, how popular the tag is based on how many times has it been associated with a communication and how many are users are associating it.

Conversations between groups of users, such as the sender 114 and recipients 116 illustrated in FIG. 1, are common, where communications may be exchanged repeatedly over a period of time. Provision of tag functionality in communication environments may enable a user to associate each communication of a conversation with one or more tags, where the associated tags may be persisted as a property of the communication across participants of the conversation, as described herein. As such, provision of tags in communication environments may improve user efficiency as the users may be able to quickly organize, search for, and/or share communications employing the associated tags. Various other features, such as automatic classification, suggestion, and/or completion of the tags, among others, may further improve user efficiency. Additionally, user interaction performance may be improved by enabling persistent presentation of tags in a conversation across mailboxes promoting collaboration among groups of users. Furthermore, analysis of the tags may inform trends associated with a user, a group of users, and/or an organization to unlock discovery scenarios.

Embodiments, as described herein, address a need that arises front very large scale of operations created by networked computing and cloud based services that cannot be managed by humans. The actions/operations described herein are not a mere use of a computer, but address results of a system that is a direct consequence of software used as a service such as the communication service 104 offered in conjunction with large numbers of users and exchanged communications.

Figure 2:
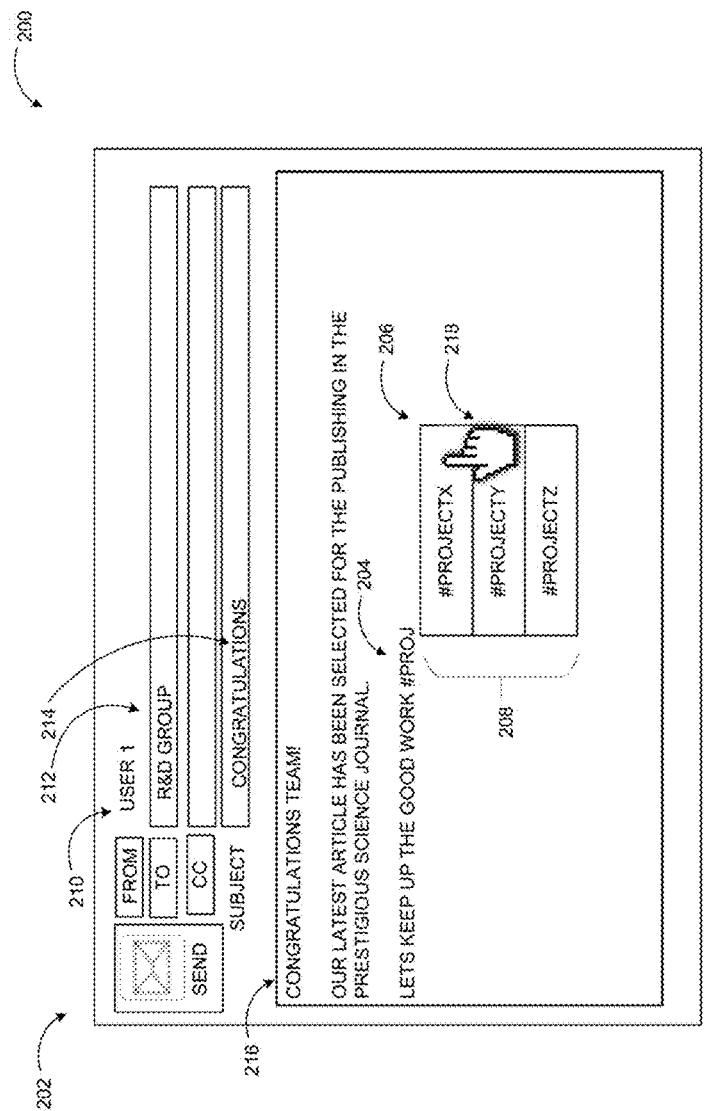
FIG. 2 illustrates an example of an automatic completion to associate a communication with one or more existing tags.

FIG. 2 illustrates an example of an automatic completion to associate a communication with one or more existing tags. A communication service may include a communication module configured to facilitate exchange of communications, and a tag module configured to associate the communications with tags such that the tags are persisted with the communications as the communications are exchanged. The tags may include a hashtag and/or a label, for example. A user experience associated with the communication service may be configured to enable the users to interact with the communication service. The user may use touch input, gesture input, voice command, eye tracking, gyroscopic input, pen input, mouse input, and/or keyboard input to interact with the user experience.

In an example scenario illustrated in diagram 200, a user may create a new communication for exchange, such as an email message 202, through the communication user experience. The tag module of the communication service may detect the user initiating input of a hashtag 204, #Proj, within a body 216 of the email message 202. For example, the tag module may scan content of the email message 202 and detect the hashtag 204 based on a format of the user input, where the format includes a hash character, or number sign, followed immediately by a word or an unspaced phrase.

The tag module may then be configured to automatically complete the hashtag 204 with an existing hashtag. For example, the tag module may compare the user input to one or more existing hashtags to determine an existing hashtag that matches the user input. The tag module may automatically insert the existing hashtag into the body 216 of the email message 202. In some embodiments, as illustrated in FIG. 2, more than one existing hashtag may match. The existing hashtags 208, #ProjectX, #ProjectY, and #ProjectZ, may be displayed in a drop-down menu 206, a pop-menu, and/or a dialog box, for example, through the communication user experience adjacent to the user input. The user may select 218 one of the existing hashtags 208. The tag module may then insert the selected existing hashtag into the body 216 of the email message 202. In some examples, the existing hashtags 208 may be displayed in a prioritized order such that the most likely existing hashtag to be selected is displayed first. Machine learning techniques may be employed, to determine priority. For example, the priority may be determined based on a tag history of past communications that include similar attributes to the attributes of the email message 202. The attributes may include a sender 210, one or more recipients 212, words in a subject 214, and/or words in the body 216 of the email message 202. For example, if a large number of past email messages sent by the sender 210 to the one or more recipients 212 included the hashtag, #ProjectX, the tag module may prioritize #ProjectX over other existing hashtags that match the user input, and display #ProjectX first.

Figure 3:
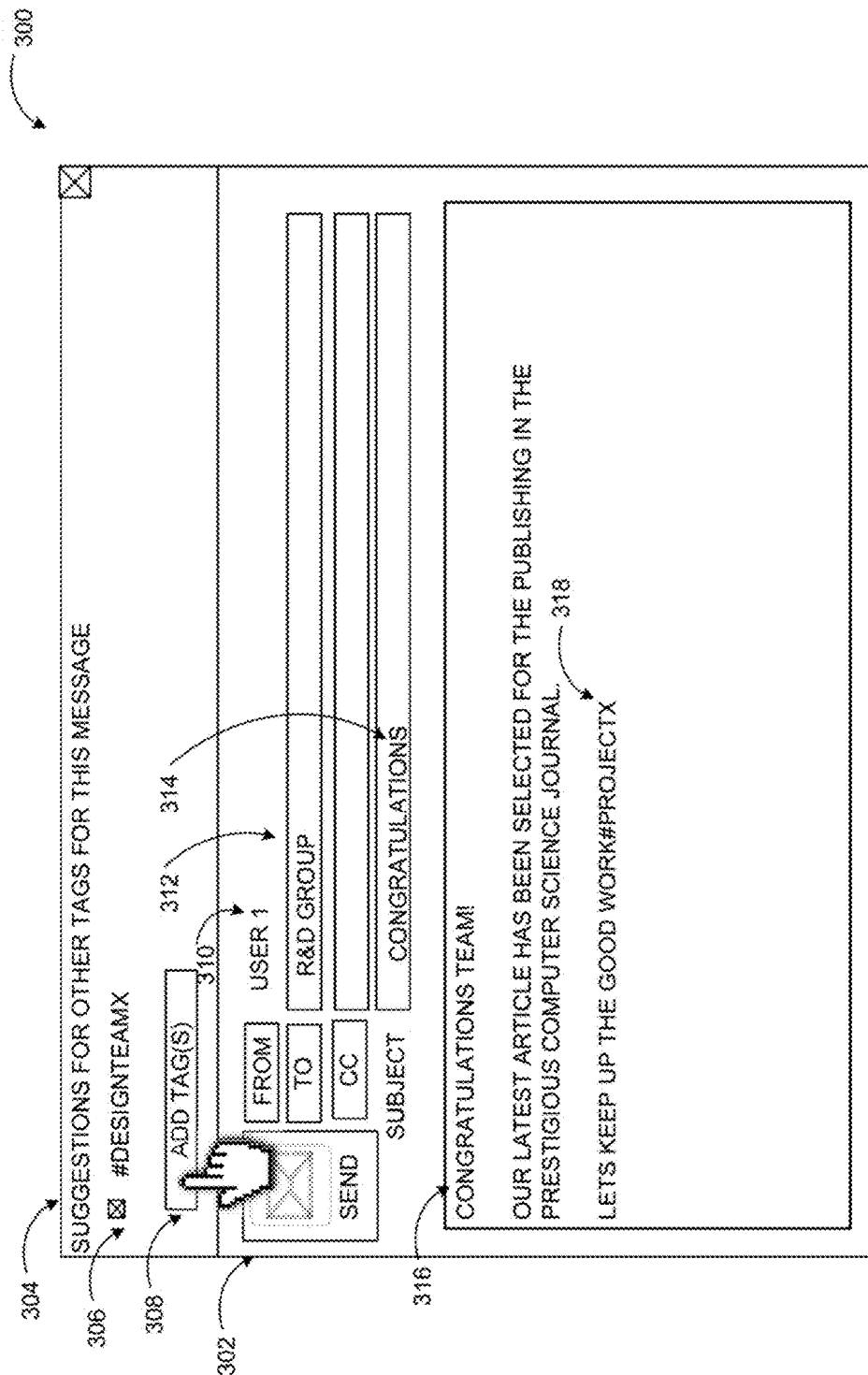
FIG. 3 illustrates an example of an automatic suggestion to associate a communication with one or more tags.

FIG. 3 illustrates an example of an automatic suggestion to associate a communication with one or more tags. A communication service may include a communication module configured to facilitate exchange of communications, a tag module configured to associate the communications with tags, and a user experience configured to enable users to interact with the communication service.

In an example scenario, illustrated in diagram 300, a user may create a new communication for exchange, such as an email message 302, through the communication user experience. The tag module may be configured to automatically suggest 304 one or more tags, such as tag 306, for association with the email message 302 through the communication user experience. For example, the tag module may determine one or more attributes of the email message 302, and suggest 304 the tag 306 based on a tag history of past email messages that include similar attributes to attributes of the email message 302. The attributes may include a sender 310, one or more recipients 312, words in a subject 314, words in the body 316 of the email message 302, and/or other tags 318 the email message 302 is associated with. For example, the sender 210 may have consistently associated past communications sent with a tag of #ProjectX, with another hashtag of #DesignTeamX. Accordingly, if the email message is being sent with the tag #ProjectX, the tag module may suggest 304 the tag 306, #DesignTeam, for association with the email message 302. In some embodiments, various thresholds may be defined in association with the suggestion. For example, a particular number of attributes of the email message 302 may need to match the attributes of the past email messages for the tag module to confidently suggest the tags.

The user may then select 308 to add the tag 306 suggested to the email message 302 through the communication user experience. In some embodiments, the tag module may provide the user an option to tag future communications that contain similar attributes with the same tags and/or enable the user to modify one or more rules associated with the suggestion. The tag 306 may be stored as a property of the email message 302 such that the tag 306 may persist with the email message 302 when the email message 302 is exchanged with one or more recipients.

Figure 4:
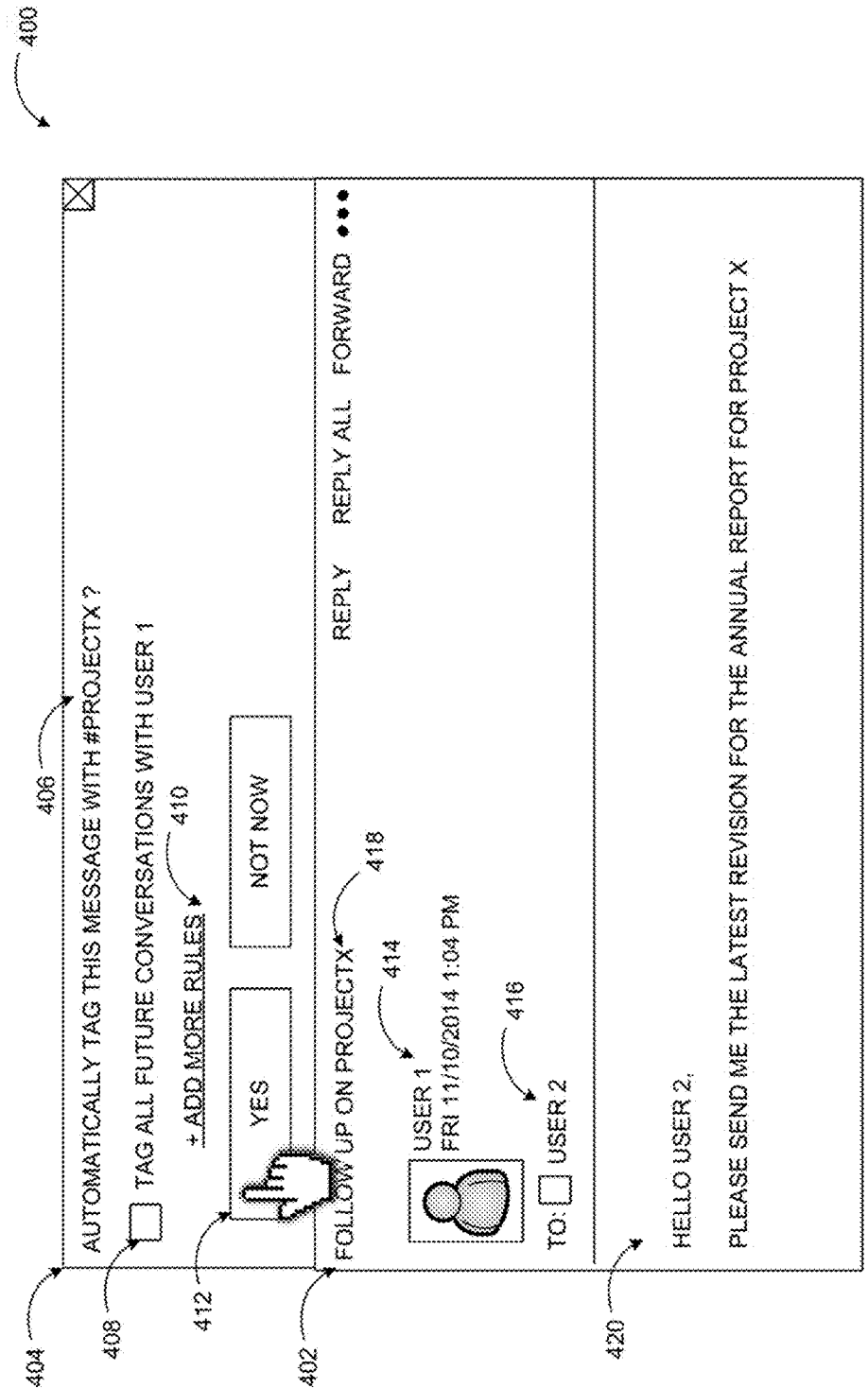
FIG. 4 illustrates another example of an automatic suggestion to associate a communication with one or more tags.

FIG. 4 illustrates another example of an automatic suggestion to associate a communication with one or more tags. As discussed previously in conjunction with FIG. 3, a tag module of a communication service may be configured to automatically suggest one or more tags for association with an email message as it is created by a sender. The tag module may also be configured to automatically suggest 404 one or more tags, such as tag 406, for association with an email message 402 received by a recipient, as illustrated in diagram 400.

The tag module may determine one or more attributes of the received email message 402, and suggest 404 the tag 406 based on a tag history of past email messages that include similar attributes to attributes of the email message 402. The attributes may include a sender 414, one or more recipients 416, words in a subject 418, words in the body 420 of the email message 402, and/or other tags the email message 402 is associated with, among other examples. For example, the email message 402 may include the word Project X within, the subject 418 and the body 420 of the email message 402. Past email messages that included the word Project X in either the subject and/or the body of the email messages may have been associated with a tag, #ProjectX. Accordingly, the tag module may suggest 404 the tag 406, #ProjectX, for association with the email message 402. In some embodiments, various thresholds may be defined in association with the suggestion. For example, a particular number of attributes of the email message 402 may need to match the attributes of the past email messages for the tag module to confidently suggest the tags. The user may then select 412 to associate the email message 402 with the tag 406 through the communication user experience. The tag 406 may be stored as a property of the email message 402 such that the tag 406 may persist with the email message 402.

In some embodiments, the tag module may provide an option 408 to associate future communications that contain similar attributes with the tag 406 in conjunction with the suggestion 404 through the communication user experience. Additionally, the tag module may provide another option 410 to modify, add, and/or delete one or more rules associated with the suggestion in conjunction with the suggestion 404 through the communication user experience.

In response to the user selection 412, the tag module may be configured to transmit a tag indication to the sender and the other of the recipients of the email message 402 to provide notification of the association of the email message 402 with the tag 406. The tag module may display the tag indication as a message or a notification that may include identifying information such as the user that associated the email message 402 with the tag 406, the tag 406, the email message 402, a group associated with the email message 402, if applicable, and/or a time elapsed from the association of the email message with the tag 406, for example.

Figure 5:
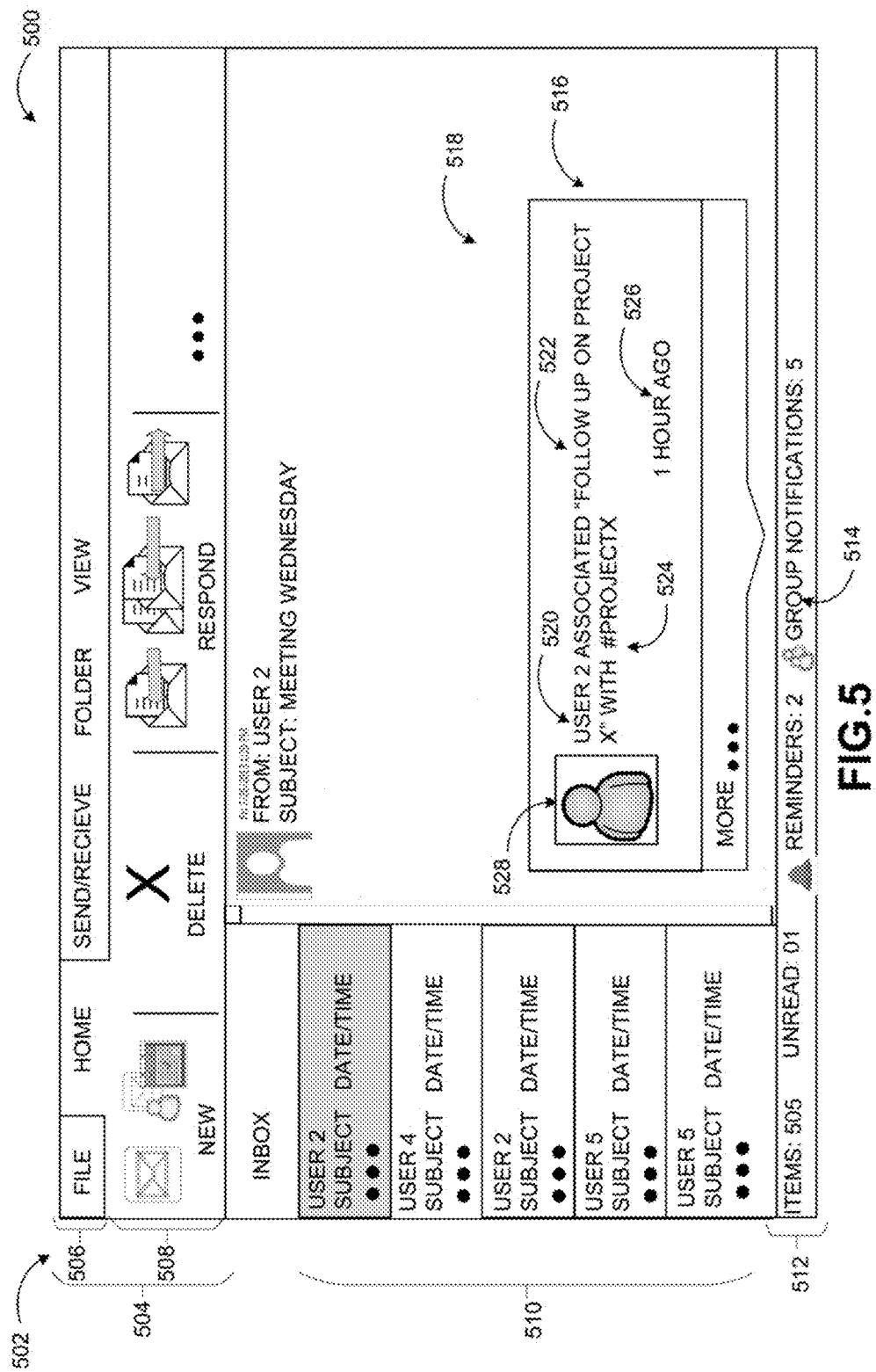
FIG. 5 illustrates an example of a tag indication distributed in response to a recipient of a communication associating the communication with one or more tags.

FIG. 5 illustrates an example of a tag indication distributed in response to a recipient of a communication associating one or more tags with the communication. A communication service may include a communication module configured to facilitate exchange of communications, a tag module configured to associate the communications with tags, and a user experience configured to enable users to interact with the communication service, among other components.

As illustrated in diagram 500, an example communication user experience 502 may display conversations and/or communications associated with an individual mailbox of a user and/or a shared mailbox of a group to which the user belongs in a conversation list view 510. The mailbox may be a server configured to store exchanged communications, including both received and sent communications, as well as draft communications and deleted communications, for example. The communication user experience 502 may also include a command bar 504 and a notification bar 512 to enable user interactivity with the communication service. The command bar 504 may include one or more tabs 506, and each of the tabs 506 may include one or more groups 508 comprising graphical control elements that enable the user to perform various actions associated with one or more modules of the communication, service, such, as communication, task, contact, and/or calendar modules. The notification bar 512 may include various notifications, such as a number of communications within the mailbox, a number of unread communications, reminders, and/or notifications 514. The command bar 504 and the notification bar 512 may employ a textual scheme, a graphical scheme, an audio scheme, an animation scheme, a coloring scheme, a highlighting scheme, and/or a shading scheme, among other schemes, to enhance presentation to the user.

In an example scenario, the user associated with the communication user experience 502 may send a communication to multiple recipients in a group, where a communication module of the communication service may facilitate exchange of communication. One of the recipients may associate the communication with a tag, such as a hash tag #ProjectX, through a communication user experience associated with the recipient. The tag module may be configured to transmit a tag indication 516 to the user (the sender) and the other recipients of the communication over a designated communication channel. For example, the designated communication channel may be a control messaging channel in a transport layer of the communication service, where the tag indication 516 may be distributed to individual and/or shared mailboxes of the user and the other recipients of the communication. In some embodiments, the tag indication 516 may be persisted in respective individual mailboxes associated with the user and the other recipients of the exchanged communication, such that the tag indication 516 may be consumable later for sender/recipients whose thin and/or thick clients, as described in conjunction with FIG. 1, are not in an online mode.

To achieve such a tag indication exchange, a lightweight and reliable mechanism for inter-mailbox communication may be employed. A transport stack that is used to deliver communications to mailboxes may be leveraged to use control messages as a reliable mechanism for inter-server communication. A standard format/schema for the control messages may be employed that distinguish the control messages from communications. For example, the control messages may include instructions for an action to be performed and metadata associated with the action, where the action may be generation of the tag indication and the metadata may include information associated with the tag. A sending component at a mailbox of the recipient that associated the communication with the tag may be configured to transmit a control message over the designated communication channel. A receiving component at a mailbox of the user and the other recipients, such as a transport delivery agent, may be configured to intercept the control message and process the metadata of the control message to generate the tag indication. The receiving component may store the tag indication in a database associated with the mailbox of the user and the other recipients such that the tag indication may be persisted.

The tag indication 516 may be displayed through the communication user experience 502. The user may be enabled to preview the tag through the displayed tag indication 516. For example, the tag indication 516 may be displayed in a notification pane 515, or other type of viewing/reading pane, automatically upon receipt of the tag indication 516. Alternatively, the tag indication 516 may be displayed in the notification pane 518 in response to a user selection of the notifications 514 control element on the notification bar 512. In some embodiments, the tag indication 516 may be displayed in conjunction with one or more other tag indications, where the tag indications may be displayed in a chronological order, with the most recently received tag indication at the top of the notification pane 518. The other tag indications may be for a same exchanged communication or may be for different communications within a same conversation. Alternatively, the other tag indications may be for communications within other conversations the user is a participant of. The tag indications may be aggregated at per communication level such that the user may be notified only when a communication is associated with a new tag. In some examples, the notification may be based on a last time the user acknowledged a displayed tag indication.

The displayed tag indication 516 may include identifying information, such as the recipient 520 that associated the communication with the tag, the tag 524, the communication 522, a group name associated with the sender/recipients of the communication/conversation, if applicable, and a time passed since the communication was associated with the tag 526. In some embodiments, the tag indication 516 may also include an icon 528 that may represent the recipient that associated the communication with the tag, as illustrated. For example, the icon 528 may be a photograph and/or avatar of the recipient. In other embodiments, the icon 528 may represent may represent the group associated with the sender and recipients.

Figure 6:
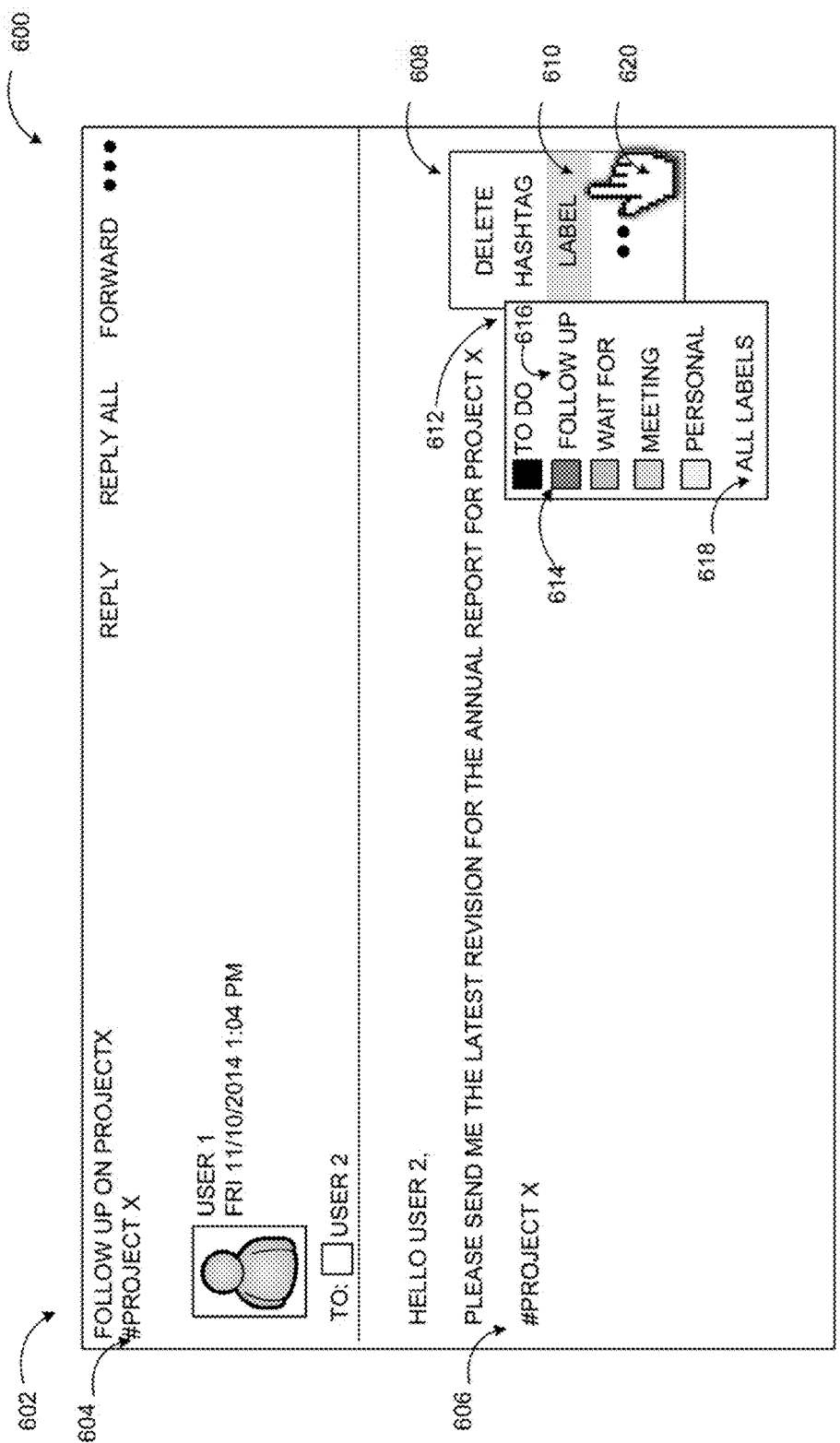
FIG. 6 illustrates an example of a communication associated with a label.

FIG. 6 illustrates an example of a communication associated with a label. A communication service may include a communication module configured to facilitate exchange of communications, a tag module configured to associate the communications with tags, and a user experience associated with the communication service may be configured to enable the users to interact with the communication service.

As shown, in diagram 600, a user may receive a communication, such as an email message 602, which has been associated with a tag such as hashtag #ProjectX. The tag may be displayed in a subject 604 of the email message 602 and/or in a body 606 of the email message 602. The user may be enabled to associate the email message 602 with additional tags through the communication user experience. For example, the user may perform an action, such as a tap, swipe, or a right click, to invoke an action pane 608. The action pane 608 may enable the user to perform various actions with the email message 602, such as to associate the email message 602 with another tag, such as a hashtag and/or a label, or delete the email message 602, among other examples. As illustrated, the user may select 620 to associate the email message 602 with a label 610. The label 610 may be private, for example, and employed for the user's own organizational purposes. As the label 610 is private, no tag indication may be sent to other participants of the communication.

In response to the user selection 620 of the label 610 in the action pane 608, a list 612 including multiple label categories may be displayed through the communication user experience. For example, the label categories may include "to do", "wait for", "follow up", "personal", and "meeting". A textual scheme, a graphical scheme, an audio scheme, an animation scheme, a coloring scheme, a highlighting scheme, and/or a shading scheme, among other schemes, may be employed to distinguish the label categories within the list 612. As illustrated, each label category may include a textual description 616 of the label and a graphical object 614 with a shading scheme. For example, the graphical object associated with the label category "to do" may have the darkest shading to indicate higher importance of the email message 602.

To conserve display space, a limited number of label categories may be displayed in the list 612, and a control element 618 may be provided to enable the user to display more label categories upon selection. In some embodiments, the label categories may be displayed within the list 612 based on most recent use and/or most frequent use. In other embodiments, the label categories may be displayed in a prioritized order such that the most likely label category to be selected is displayed first. Machine learning techniques may be employed to determine priority based on the attributes of the email message 602. The attributes may include a sender, one or more recipients, key words in a subject, a size of the subject, key words in a body, a size of the body, and/or other tags associated with the email message 602, among other example. For example, the key words "please send me" in the body 606 of the email message may cause action based label categories, such as "to do" and "follow-up", to be displayed higher in the list 612.

Figure 7:
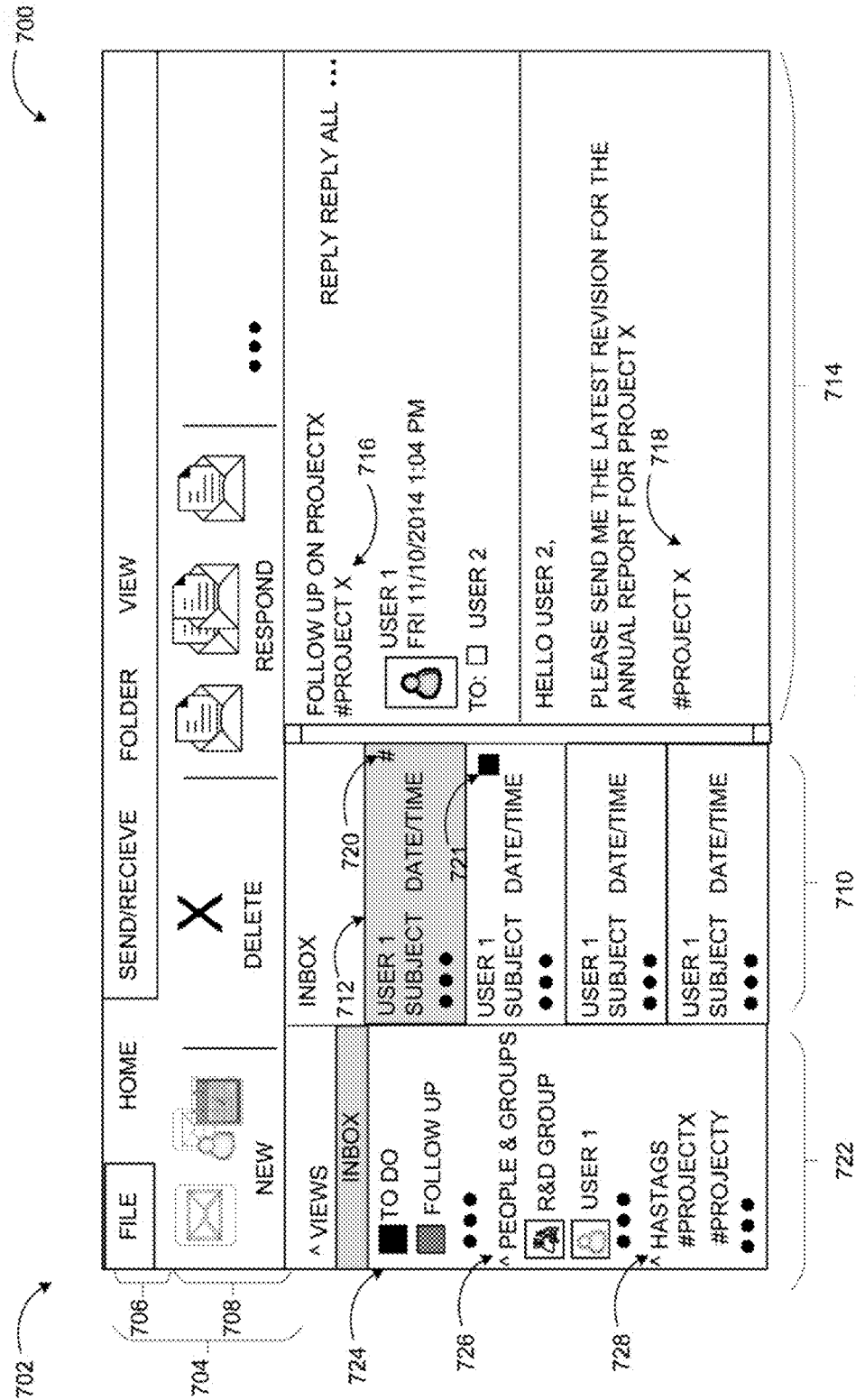
FIG. 7 illustrates an example of search and navigation features enabled through provision of tags in a communication environment.

FIG. 7 illustrates an example of search and navigation features enabled through provision of lags in a communication environment. A communication service may include a communication module configured to facilitate exchange of communications, a tag module configured to associate the communications with tags, and a user experience configured to enable users to interact with the communication service, among other components.

As illustrated is diagram 700, an example communication user experience 702 may include a command bar 704 to enable user interactivity with the communication service. The command bar 704 may include one or more tabs 706, and each of the tabs 706 may include one or more groups 508 comprising graphical control elements that enable the user to perform various actions associated with one or more modules of the communication service, such as communication, task, contact, and/or calendar modules. The communication user experience 702 may display conversations and/or communications associated with an individual mailbox of the participant and/or a shared mailbox of a group to which the user belongs in a conversation list view 710. The mailbox may be a server configured to store exchanged communications, including both received and sent communications, as well as draft communications and deleted communications, for example. Upon user selection of one of the conversations, such as conversation 712, the one or more communications within the conversation 712, such as email message 714, may be displayed.

The email message 714 may be associated with a tag, such as hash tag #ProjectX. The tag may be displayed in a subject 716 of the email message 714 and/or in a body 718 of the email message 714. In some examples, a coloring scheme, a highlighting scheme, and/or a shading scheme, among other schemes, may be employed for the displayed tag to enhance visibility of the tag among the other content of the email message 714. In other embodiments, an icon may also be displayed in conjunction with the conversation 712 within the conversation list view 710 to indicate the email message 714 has an associated tag. For example, the icon may be a hash character 720 to indicate the email message 714 has an associated hashtag. In other examples, the icon may be a graphical element with a shading scheme 721 to indicate the email message 714 has an associated label. The user may select one or more of the displayed tags in order to navigate to all conversations and/or communications, including the email message 714, associated with the tag. The user may also be enabled to favorite these conversations and/or communications associated with the tag in a navigation pane 722 of the communication user experience 702 such that the user may quickly reference them in the future. The navigation pane 722 may further enable the user to efficiently search for conversations and/or communications within the user mailbox. The user may search for conversations and/or communications by tags, including labels 724 and hashtags 728. For example, the user may search for all communications with the hashtag #ProjectX in the user's mailbox. The user may also combine tags to narrow the search. For example, the user may search for all communications associated with the hashtag #ProjectX, and a label of "To Do" in the user's mailbox. The user may also search for conversations and/or communications by individual users or groups 726.

The example scenarios and schemas in FIG. 1 through 7 are shown with specific components, modules, data types, and user experience configurations. Embodiments are not limited to systems according to these example configurations. Provision of tags in communication environments may be implemented in configurations employing fewer or additional components in applications/services and user experiences. Furthermore, the example schema and components shown in FIG. 1 through 7 and their subcomponents may be implemented in a similar manner with other values using the principles described herein.

Figure 8:
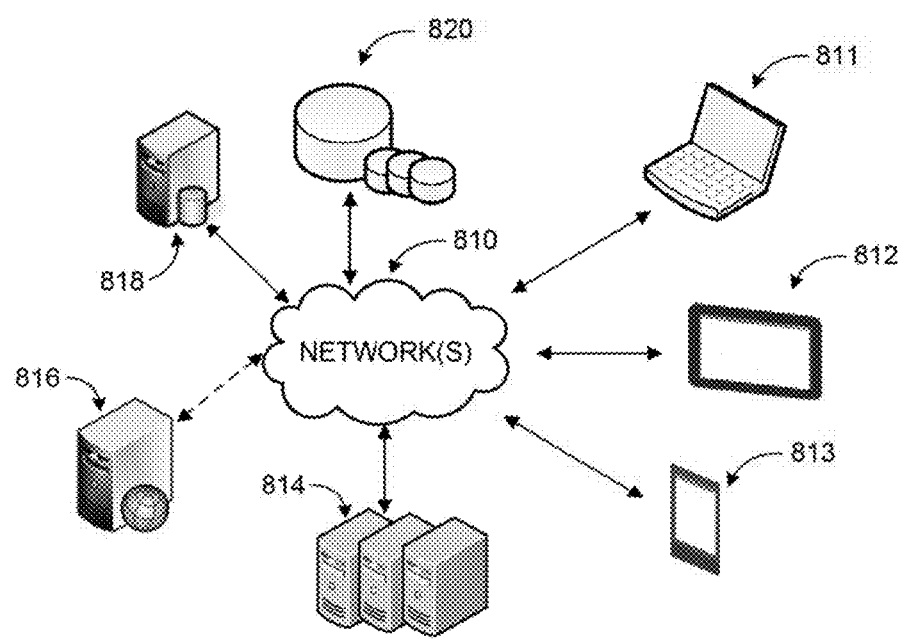
FIG. 8 is a simplified networked environment, where embodiments may be implemented.

FIG. 8 is an example networked environment, where embodiments may be implemented. A communication service may be implemented via software executed over one or more servers 814 such as a hosted service. The platform may communicate with client applications on individual computing devices such as a smart phone 813, a tablet 812, or a laptop computer 811 ('client devices') through network(s) 810.

Client applications executed on any of the client devices 811-813 may facilitate communications via application(s) executed by servers 814, or on individual server 816. A communication module of the communication service may be configured to facilitate exchange of one or more communications such as emails, text messages, online meeting notes/recording, attachments, contact information, calendar items, and similar ones as users communicate through the client devices 811-813, over network(s) 810. A tag module of the communication service may be configured to associate a communication with one or more tags such that the tags may be persisted as the communication is exchanged. The communication may be transmitted to participants of the conversation, where the tags may be displayed in conjunction with the communication through communication user experiences associated with the participants such that the participants may be enabled to interact with the tags. The communication service may store data associated with is services, such as tag related data, in data store(s) 820 directly or through database server 818.

Network(s) 810 may comprise any topology of servers, clients, Internet service providers, and communication media. A system according to embodiments may have a static or dynamic topology. Network(s) 810 may include secure networks such as an enterprise network, an unsecure network such as a wireless open network, or the Internet. Network(s) 810 may also coordinate communication over other networks such as Public Switched Telephone Network (PSTN) or cellular networks. Furthermore, network(s) 810 may include short-range wireless networks such as Bluetooth or similar ones. Network(s) 810 provide communication between the nodes described herein. By way of example, and not limitation, network(s) 810 may include wireless media such as acoustic, RF, infrared and other wireless media.

Many other configurations of computing devices, applications, data sources, and data distribution systems may be employed to provide tags in communication environments. Furthermore, the networked environments discussed in FIG. 8 are for illustration purposes only. Embodiments are not limited to the example applications, modules, or processes.

Figure 9:
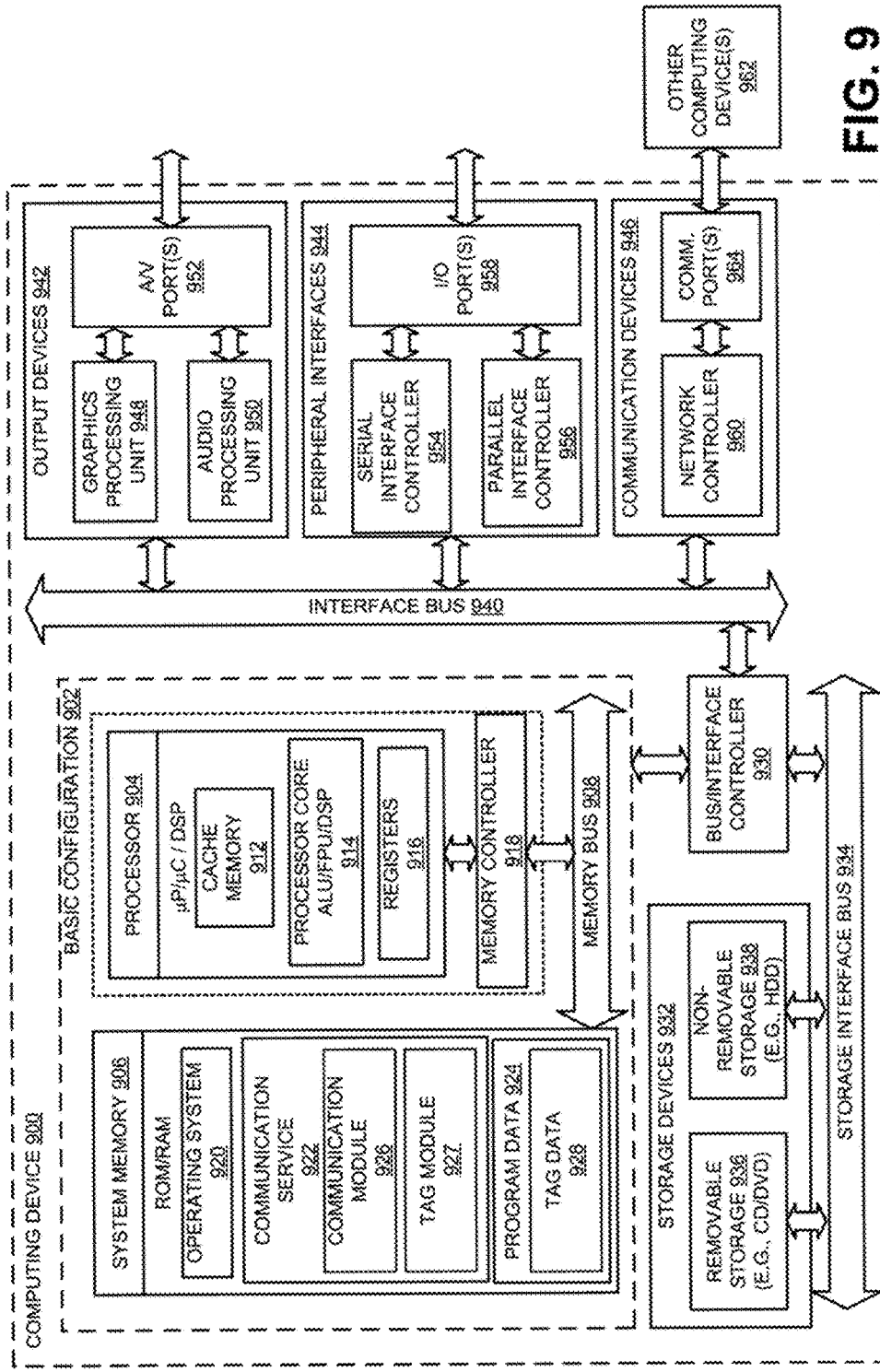
FIG. 9 illustrates a general purpose computing device, which may be configured to provide tags in communication environments.

FIG. 9 illustrates a general purpose computing device, which may be configured to provide tags in communication environments, arranged in accordance with at least some embodiments described herein.

For example, computing device 900 may be used as a server, desktop computer, portable computer, smart phone, special purpose computer, or similar device. In an example basic configuration 902, the computing device 900 may include one or more processors 904 and a system memory 906. A memory bus 908 may be used for communicating between the processor 904 and the system memory 906. The basic configuration 902 is illustrated in FIG. 9 by those components within the inner dashed line.

Depending on the desired configuration, the processor 904 may be of any type, including but not limited to a microprocessor (μP), a microcontroller (μC), a digital signal processor (DSP), or any combination thereof. The processor 904 may include one more levels of caching, such as a level cache memory 912, one or more processor cores 914, and registers 916. The example processor cores 914 may (each) include an arithmetic logic unit (ALU), a floating point unit (FPU), a digital signal processing core (DSP Core), or any combination thereof. An example memory controller 918 may also be used with the processor 904, or in some implementations the memory controller 918 may be an internal part of the processor 904.

Depending on the desired configuration, the system memory 906 may be of any type including but not limited to volatile memory (such as RAM), non-volatile memory (such as ROM, flash memory, etc.) or any combination thereof. The system memory 906 may include an operating system 920, a communication service 922, and program data 924. The communication service 922 may include a communication module 926 and a tag module 927, which may be an integral part of the communication service 922 or a separate application. The communication module 926 may be configured to facilitate exchange of communications within a conversation. The tag module 927 may be configured to associate a communication with one or more tags, where the tags may be stored as properties of the communication such that the tags may be persisted as the communication is exchanged. In some embodiments, the tag module 927 may also provide automatic classification, suggestion, and/or completion of the tags. The communication may be transmitted to participants of the conversation, where the tags may be displayed in conjunction with the communication through communication user experiences associated with the participants such that the participants may be enabled to interact with the tags. Program data 924 may include, among other things, tag data 928 related to tags and tag indications, as described herein.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 906, the removable storage devices 936 and the non-removable storage devices 938 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (for example, one or more output devices 942, one or more peripheral interfaces 944, and one or more communication devices 946) to the basic configuration 902 via the bus/interface controller 930. Some of the example output devices 942 include a graphics processing unit 948 and an audio processing unit 950, which may be configured to communicate to various external devices such as a display or speakers via one or more A/V ports 952. One or more example peripheral interfaces 944 may include a serial interface controller 954 or a parallel interface controller 956, which may be configured to communicate with external devices such as input devices (for example, keyboard, mouse, pen, voice input device, touch input device, etc.) or other peripheral devices (for example, printer, scanner, etc.) via one or more I/O ports 958. An example communication device 946 includes a network controller 960, which may be arranged to facilitate communications with one or more other computing devices 962 over a network communication link via one or more communication ports 964. The one or more other computing devices 962 may include servers, computing devices, and comparable devices.

The network communication link may be one example of a communication media. Communication media may typically be embodied by computer readable instructions, data structures, program modules, or other data in a modulated, data signal, such as a earner wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 900 may be implemented as a part of a general purpose or specialized server, mainframe, or similar computer that includes any of the above functions. The computing device 900 may also be implemented as a personal computer including both laptop computer and non-laptop computer configurations.

Example embodiments may also include methods for provision of tags in communication environments. These methods can be implemented in any number of ways, including the structures described herein. One such way may be by machine operations, of devices of the type described in the present, disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 10:
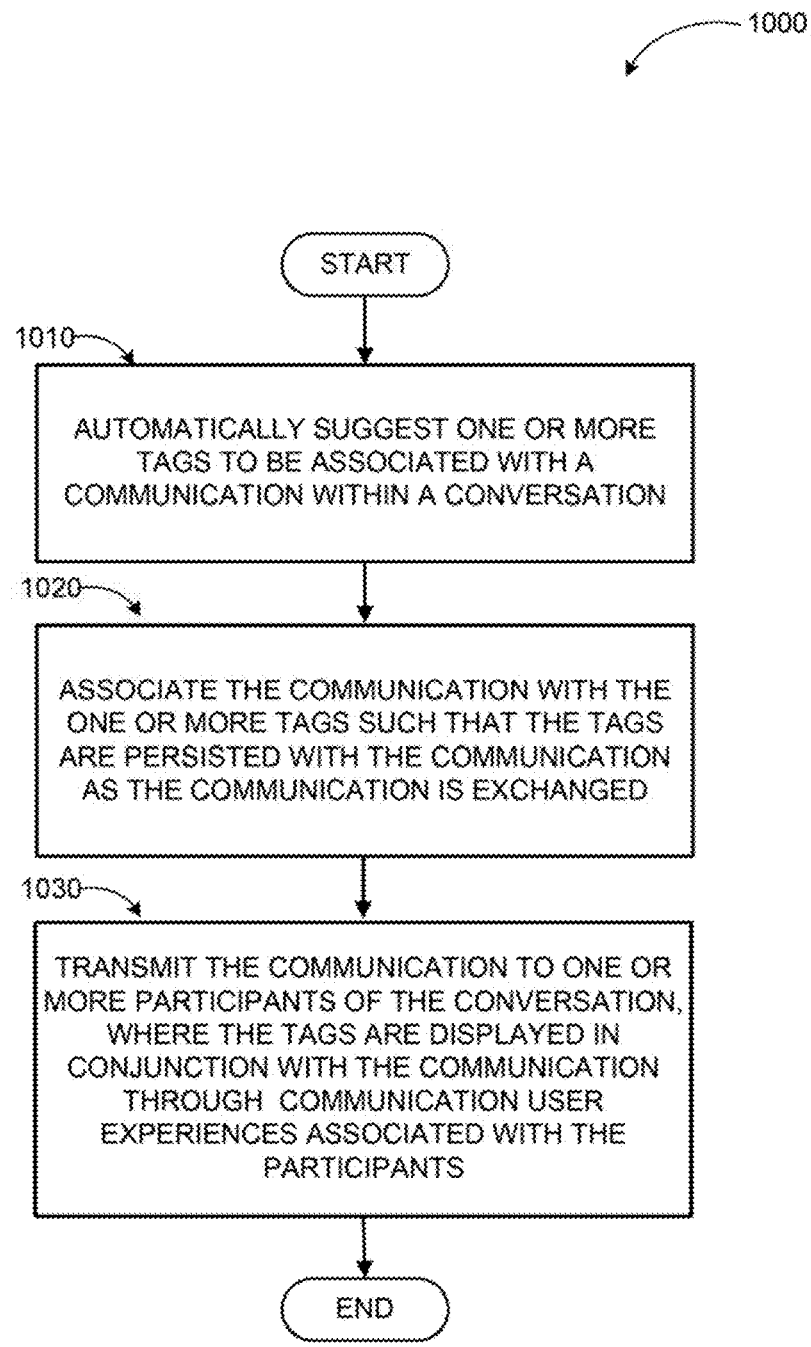
FIG. 10 illustrates a logic flow diagram for an example process to provide tags in communication environments, according to embodiments.

FIG. 10 illustrates a logic flow diagram for an example process of providing tags in a communication environment, according to embodiments. Process 1000 may be implemented by one or more communication services and/or their components executed on one or more servers or other computing devices.

Process 1000 begins with operation 1010, where a tag module of a communication service may be configured to automatically suggest one or more tags to be associated with a communication within a conversation. The tags may include a hashtag and/or a label, and the tags may be private or public, for example. The communication may be an email exchange, a meeting invite, a shared contact card, a shared task, a text message exchange, an online conference, an audio communication, a video communication, an application sharing session, a desktop sharing session, and/or a data sharing session, among other examples. The tag module may employ machine learning techniques to automatically suggest the tags. In one example, the tag module may determine one or more attributes of the communication and automatically suggest the tags based on a tag history of past communications comprising similar attributes to the determined attributes of the communication. The attributes may include a sender of the communication, one or more recipients of the communication, key words in a subject of the communication, key words in a body of the communication, and/or one or more other tags associated with the communication. In conjunction with the suggestion, an option may be provided to tag future communications with a same one or more tags and/or to modify one or more rules associated with the suggestion. In some embodiments, the tag module may also provide automatic classification, and/or completion of the tags.

At operation 1020, the tag module may associate the communication with the tags such that the tags are persisted with the communication as the communication is exchanged. To achieve persistence, the tags may be stored as a property of the communication. For example, a content of the communication may be scanned for the tags, the tags may be extracted, and metadata associated with the tags may be stored as a property of the communication. The property may be a conversation aggregated property such that the tags may be aggregated per-communication and per-conversation.

At operation 1030, a tag module may transmit the communication to one or more-participants of the conversation over one or more communication exchange channels (the exchange facilitated by a communication module of the communication service). The tags may be displayed in conjunction, with the communication through communication user experiences associated with the participants. For example, the tags may be displayed in a body of the communication and/or in a subject of the communication. The participants may be enabled to interact with the tags through the communication user experiences. For example, the participants may employ a tag to search for conversations and/or communications associated with the tag. Additionally, the participants may navigate directly to conversations and/or communications associated with a tag by selecting the displayed tag. The participants may also be enabled to associate the communication with one or more additional tags. In response to the association of the additional tags, the tag module may be configured to transmit a tag indication based on the additional tags over a designated channel to the other participants of the communication to notify the other participants of the additional tags. The designated channel may be distinct from the communication exchange channels in order to reduce communication traffic.

The operations included in process 1000 are for illustration purposes. A communication service providing endorsement indications according to embodiments may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means for providing tags in a communication environment may include a means for automatically suggesting one or more tags to be associated with a communication within a conversation, a means for associating the communication with the tags such that the tags are persisted with the communication as the communication is exchanged within the conversation, and a means for transmitting the communication to one or more participants of the conversation over one or more communication exchange channels, where the tags are displayed, in conjunction with the communication through communication user experiences associated with the one or more participants.

According to some examples, computing devices to provide tags in a communication environment are described. An example computing device may include a memory configured to store instructions, and one or more processors coupled to the memory that are configured to execute a communication service, where the communication service may include a communication module and a tag module. The communication module may be configured to facilitate exchange of one or more communications within a conversation over one or more communication exchange channels. The tag module may be configured to associate a communication with one or more tags such that the tags are persisted with the communication as the communication is exchanged within the conversation, where the communication may include an email exchange, a meeting invite, a shared contact card, a shared task, an online conference, an audio communication, a video communication, an application sharing session, a desktop sharing session, and/or a data sharing session, and transmit the communication to one or more participants of the conversation over the communication exchange channels, where the tags may be displayed in conjunction with the communication through communication user experiences associated with the participants.

In other examples, the tag module may be further configured to scan a content of a received communication for the tags, and extract the tags from the content. The tags may include a hashtag or a label. The tags may be public or private. The tags may be displayed in a body of the communication and/or a subject of the communication. The tag module may be further configured to analyze a use of the tags to determine trends associated with the participants, a group associated with the participants, and/or an organization associated with the participants.

According to some embodiments, methods executed on one or more computing devices to provide tags in a communication environment are provided. An example method may include automatically suggesting one or more tags to be associated with a communication within a conversation, where the communication includes an email exchange, a meeting invite, a shared contact card, a shared task, an online conference, an audio communication, a video communication, an application sharing session, a desktop sharing session, and/or a data sharing session, associating the communication with the tags such that the tags are persisted with the communication as the communication is exchanged within the conversation, and transmitting the communication to one or more participants of the conversation over one or more communication exchange channels, where the tags are displayed in conjunction with the communication through communication user experiences associated with the one or more participants.

In other embodiments, the participants may be enabled to search for conversations and/or communications employing the tags. The participants may be enabled to navigate to conversations and/or communications associated with the tags through selection of the displayed tags. Automatically suggesting the tags to be associated with the communication may include determining one or more attributes of the communication, and automatically suggesting the tags based on a tag history of past communications comprising similar attributes to the determined attributes. The determined attributes may include a sender of the communication, one or more recipients of the communication, key words in a subject of the communication, key words in a body of the communication, and/or one or more other tags associated with the communication.

In further embodiment, an option to tag future communications with a same one or more tags may be provided in conjunction with the suggestion. Modification of one or more rules associated with the suggestion may also be enabled. The communication may be automatically classified with the tags based on a content of the communication. The tag input may be automatically completed with an existing tag in response to detecting tag input. The tags may be stored as a property of the communication by scanning a content of the communication for the tags, extracting the tags from the content, and storing metadata associated with the tags as the property of the communication.

According to some examples, computer readable memory devices with instructions stored thereon to provide tags in a communication environment are described. Example instructions may include receiving a communication associated with one or more tags, where the communication may include an email exchange, a meeting invite, a shared contact card, a shared task, an online conference, an audio communication, a video communication, an application sharing session, a desktop sharing session, and/or a data sharing session, displaying the tags in conjunction with the communication through a communication user experience associated with a recipient of the communication, and enabling the recipient to search for other communications associated with the tags by selecting the tags though the communication user experience.

In other examples, the recipient may be enabled to associate the communication with one or more additional tags through the user experience. A tag indication based on the one or more additional tags may be transmitted to a sender and one or more other recipients of the communication over a designated communication channel, and display of the tag indication may be enabled through communication user experiences associated with the sender and the other recipients of the communication. The designated communication channel may be a control messaging channel in a transport layer of a communication service.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide tags in a communication environment, the computing device comprising:
a memory configured to store instructions; and
one or more processors coupled to the memory that are configured to execute a communication service, wherein the communication service comprises:
a communication module configured to facilitate exchange of a communication within a conversation over a communication exchange channel; and
a tag module configured to:
associate the communication with a tag such that the tag is persisted with the communication as the communication is exchanged within the conversation, wherein the communication includes one or more of an email exchange, a meeting invite, a shared contact card, a shared task, an online conference, an audio communication, a video communication, an application sharing session, a desktop sharing session, and a data sharing session;
transmit the communication to a participant of the conversation over the communication exchange channel, wherein the tag is displayed in conjunction with the communication through a communication user experience associated with the participant; and
receive a tag indication in response to the participant associating an additional tag with the communication, wherein information within the tag indication identifies the communication, the tag, the additional tag, and the participant.

2. The computing device of claim 1, wherein the tag module is further configured to:
scan a content of a received communication for the tag; and
extract the tag from the content.

3. The computing device of claim 1, wherein the tag includes one of a hashtag and a label.

4. The computing device of claim 1, wherein the tag is one of public or private.

5. The computing device of claim 1, wherein the tag is displayed in one or more of a body of the communication and a subject of the communication.

6. The computing device of claim 1, wherein the tag module is further configured to analyze a use of the tag to determine trends associated with the participant, a group associated with the participant, and an organization associated with the participant.

7. A method executed on a computing device to provide tags in a communication environment, the method comprising:
automatically suggesting a tag to be associated with a communication within a conversation, wherein the communication includes one or more of an email exchange, a meeting invite, a shared contact card, a shared task, an online conference, an audio communication, a video communication, an application sharing session, a desktop sharing session, and a data sharing session;

associating the communication with the tag such that the tag is persisted with the communication as the communication is exchanged within the conversation;

transmitting the communication to a participant of the conversation over a communication exchange channel, wherein the tag is displayed in conjunction with the communication through a communication user experience associated with the participant; and receiving a tag indication in response to the participant associating an additional tac with the communication, wherein information within the tag indication identifies the communication, the tag, the additional tag, and the participant.

8. The method of claim 7, further comprising:
enabling the participant to search for one or more of conversations and communications employing the tag.

9. The method of claim 7, further comprising:
enabling the participant to navigate to one or more of conversations and communications associated with the tag through selection of the tag through the communication user experience.

10. The method of claim 7, wherein automatically suggesting the tag to be associated with the communication further comprises:
determining one or more attributes of the communication; and
automatically suggesting the tag based on a tag history of past communications comprising similar attributes to the determined one or more attributes.

11. The method of claim 10, wherein the determined one or more attributes comprise one or more of a sender of the communication, one or more recipients of the communication, key words in a subject of the communication, key words in a body of the communication, and one or more other tags associated with the communication.

12. The method of claim 10, further comprising:
providing an option to tag future communications with a same tag in conjunction with the suggestion.

13. The method of claim 10, further comprising:
enabling modification of one or more rules associated with the suggestion.

14. The method of claim 7, further comprising:
automatically classifying the communication with the tag based on a content of the communication.

15. The method of claim 7, further comprising:
in response to detecting tag input, automatically completing the tag input with an existing tag.

16. The method of claim 7, further comprising:
storing the tag as a property of the communication by:
scanning a content of the communication for the tag;
extracting the tag from the content; and
storing metadata associated with the tag as the property of the communication.

17. A computer readable memory device with instructions stored thereon to provide tags in a communication environment, the instructions comprising:
receiving a communication associated with a tag, wherein the communication includes one or more of an email exchange, a meeting invite, a shared contact card, a shared task, an online conference, an audio communication, a video communication, an application sharing session, a desktop sharing session, and a data sharing session;
displaying the tag in conjunction with the communication through a communication user experience associated with a recipient of the communication;
enabling the recipient to search for other communications associated with the tag by selecting the tag though the communication user experience; and
transmitting a tag indication to a sender and one or more other recipients of the communication in response to the recipient associating an additional tag with the communication, wherein information within the tag indication identifies the communication, the tag, the additional tag, and the recipient.

18. The computer readable memory device of claim 17, wherein the instructions further comprise:
enabling the recipient to associate the communication with the additional tag through the user experience.

19. The computer readable memory device of claim 17, wherein the instructions further comprise:
transmitting the tag indication over a designated communication channel; and
enabling display of the tag indication through communication user experiences associated with the sender and the one or more other recipients of the communication.

20. The computer readable memory device of claim 19, wherein the designated communication channel is a control messaging channel in a transport layer of a communication service.

* * * * *